(12) United States Patent
Wang et al.

(10) Patent No.: US 12,283,717 B2
(45) Date of Patent: Apr. 22, 2025

(54) COMPOSITE SEPARATOR, ELECTROCHEMICAL ENERGY STORAGE APPARATUS, AND ELECTRICAL APPARATUS

(71) Applicant: CONTEMPORARY AMPEREX TECHNOLOGY (HONG KONG) LIMITED, Hong Kong (CN)

(72) Inventors: Manman Wang, Fujian (CN); Xiaoming Ge, Fujian (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 217 days.

(21) Appl. No.: 18/202,293

(22) Filed: May 26, 2023

(65) Prior Publication Data

US 2023/0327288 A1     Oct. 12, 2023

Related U.S. Application Data

(63) Continuation of application No. PCT/CN2022/095241, filed on May 26, 2022.

(30) Foreign Application Priority Data

Sep. 29, 2021 (CN) .......................... 202111150172.3

(51) Int. Cl.
    *H01M 50/449*     (2021.01)
    *H01M 10/0525*    (2010.01)
    *H01M 50/431*     (2021.01)

(52) U.S. Cl.
    CPC ..... *H01M 50/449* (2021.01); *H01M 10/0525* (2013.01); *H01M 50/431* (2021.01); *H01M 2220/20* (2013.01)

(58) Field of Classification Search
    CPC .......... H01M 50/449; H01M 10/0525; H01M 50/431; H01M 2220/20; H01M 50/414;
(Continued)

(56) References Cited

U.S. PATENT DOCUMENTS

| | | |
|---|---|---|
| 2005/0079424 A1 | 4/2005 | Davis et al. |
| 2011/0117413 A1 | 5/2011 | Wang et al. |

(Continued)

FOREIGN PATENT DOCUMENTS

| | | | |
|---|---|---|---|
| CA | 3098634 A1 * | 11/2019 | ........ H01M 10/0525 |
| CN | 103545472 A | 1/2014 | |

(Continued)

OTHER PUBLICATIONS

Office Action issued Jul. 25, 2024 in Chinese Patent Application No. 202111150172.3 with Concise Explanation of Relevance in English.

(Continued)

*Primary Examiner* — Kenneth J Douyette
(74) *Attorney, Agent, or Firm* — XSENSUS LLP

(57) ABSTRACT

The present application provides a composite separator, an electrochemical energy storage apparatus, and an electrical apparatus. The composite separator provided in a first aspect of the present application may comprise: a first base film and a second base film; and an anode protection layer located between the first base film and the second base film in a thickness direction of the composite separator, for capturing transition metal ions. The anode protection layer for capturing transition metal ions may be arranged between the first base film and the second base film to prevent the anode protection layer from falling off from an outer surface of the base films during prolonged use, so that the anode protection layer can have more stable anode protection effects in prolonged use of the electrochemical energy storage appa- (Continued)

ratus, and improve the application performance of the electrochemical energy storage apparatus.

10 Claims, 4 Drawing Sheets

(58) Field of Classification Search
CPC ............ H01M 50/443; H01M 50/451; H01M 50/446; H01M 50/457; H01M 50/249; H01M 50/409; H01M 50/411; H01M 50/434; H01M 50/586; H01M 50/59; Y02E 60/10
See application file for complete search history.

(56) References Cited

U.S. PATENT DOCUMENTS

| | | | | |
|---|---|---|---|---|
| 2011/0281174 | A1* | 11/2011 | Seymour | H01M 4/366 |
| | | | | 429/207 |
| 2017/0365883 | A1 | 12/2017 | Luski et al. | |
| 2019/0198837 | A1* | 6/2019 | Yushin | H01M 50/44 |
| 2021/0036292 | A1 | 2/2021 | Guo | |
| 2021/0036360 | A1* | 2/2021 | Li | H01M 10/0525 |
| 2022/0029160 | A1* | 1/2022 | Thackeray | H01M 4/505 |
| 2022/0102791 | A1* | 3/2022 | Schreiber | H01G 11/82 |

FOREIGN PATENT DOCUMENTS

| | | | | |
|---|---|---|---|---|
| CN | 204577500 | U | 8/2015 | |
| CN | 107528086 | A | 12/2017 | |
| CN | 109935754 | A | 6/2019 | |
| CN | 109935771 | A | 6/2019 | |
| CN | 110710024 | A * | 1/2020 | ........ H01M 10/0525 |
| CN | 111081953 | A | 4/2020 | |
| CN | 211376780 | U | 8/2020 | |
| CN | 113193303 | A | 7/2021 | |
| CN | 109216766 | B | 11/2021 | |
| CN | 111584798 | B | 11/2022 | |
| JP | 2007-507850 | A | 3/2007 | |
| JP | 2014-225410 | A | 12/2014 | |
| JP | 2016-062849 | A | 4/2016 | |
| JP | 2016-167353 | A | 9/2016 | |
| JP | 2017-188273 | A | 10/2017 | |
| WO | 2013/147006 | A1 | 10/2013 | |
| WO | WO-2019116959 | A1 * | 6/2019 | ............ B01J 20/02 |

OTHER PUBLICATIONS

Office Action issued Jul. 2, 2024 in Japanese Patent Application No. 2023-530920 with English translation thereof.
Office Action issued Jun. 1, 2024 in Chinese Patent Application No. 202111150172.3 with English translation.
International Search Report and Written Opinion mailed on Aug. 4, 2022, received for PCT Application PCT/CN2022/095241, filed on May 26, 2022, 8 pages including English Translation.
Office Action issued Feb. 10, 2025 in Korean Patent Application No. 10-2023-7016539 with English translation thereof.
Extended European Search Report issued Feb. 24, 2025 in European Patent Application No. 22874240.9.

* cited by examiner

COMPOSITE SEPARATOR, ELECTROCHEMICAL ENERGY STORAGE APPARATUS, AND ELECTRICAL APPARATUS

CROSS-REFERENCE TO RELATED APPLICATIONS

The present application is a continuation of International Application No. PCT/CN2022/095241, filed May 26, 2022, which claims the priority of Chinese Patent Application No. 202111150172.3 filed on Sep. 29, 2021 and titled "COMPOSITE SEPARATOR, ELECTROCHEMICAL ENERGY STORAGE APPARATUS, AND ELECTRICAL APPARATUS," the entire contents of each are incorporated herein by reference.

TECHNICAL FIELD

The present application relates to the technical field of electrochemical energy storage apparatuses, and in particular to, a composite separator, an electrochemical energy storage apparatus, and an electrical apparatus.

BACKGROUND ART

In an electrochemical energy storage apparatus, a separator is provided between an anode and a cathode as a key component. Further, the separator has the performance of making ions conductive, and is used to guarantee regular transmission of the ions between the anode and the cathode without occurrence of a short circuit. At present, it is difficult to perform prolonged protection of an anode electrode sheet in the electrochemical energy storage apparatus by arrangement of a functional coating of the separator, thereby damaging application performance of the electrochemical energy storage apparatus to a certain degree, such as worsening the cycling performance, reducing the capacity retention rate and the like. Therefore, the existing separator still remains to be improved.

SUMMARY OF THE DISCLOSURE

The present application is provided to solve the above problems, and is intended to provide a composite separator, an electrochemical energy storage apparatus comprising the composite separator, and an electrical apparatus comprising the composite apparatus that can solve a problem that it is difficult to perform prolonged protection of an anode electrode sheet in the electrochemical energy storage apparatus by arrangement of a functional coating of a general separator.

In order to achieve the above goals, a first aspect of the present application provides a composite separator, comprising: a first base film and a second base film; and an anode protection layer located between the first base film and the second base film in a thickness direction of the composite separator, for capturing transition metal ions.

Therefore, a first aspect of the present application provides the anode protection layer for capturing transition metal ions between the first base film and the second base film, such that the composite separator has a sandwich design to prevent the anode protection layer from falling off from an outer surface of the base films during prolonged use with the help of sandwich and protection effects of the first base film and the second base film on the anode protection layer, and such that the anode protection layer can have more stable anode protection effects in prolonged use of the electrochemical energy storage apparatus, and improve application performance of the electrochemical energy storage apparatus.

In any embodiment of a first aspect of the present application, the anode protection layer comprises a complexing agent; where the complexing agent is selected from at least one of a phosphate complexing agent, a hydroxycarboxylate complexing agent, and an aminocarboxylate complexing agent. The anode protection layer comprises the complexing agent, to capture transition metals through a complexation reaction between the complexing agent and the transition metal ions dissolved from a cathode electrode sheet into an electrolyte solution, and prevent deposition of the dissolved transition metal ions in the anode electrode sheet from damaging a SEI.

In any embodiment of a first aspect of the present application, the complexing agent is selected from at least one of disodium hydroxyethylidene diphosphonate, disodium ethylenediamine tetraacetate, tetrasodium ethylenediamine tetraacetate, hydroxyethylethylenediaminetriacetic acid, diethylenetriaminepentaacetic acid, citric acid, carboxymethyl tartaric acid, carboxymethyloxysuccinic acid, 1,2,3,4-cyclopentanetetracarboxylic acid, and sodium aminotriphosphate.

In any embodiment of a first aspect of the present application, a thickness value of the anode protection layer ranges from 0.5 μm to 8 μm. In these embodiments, not only can a target ion, such as a lithium ion, be guaranteed to smoothly pass through the separator, but also the anode protection layer can capture many transition metal ions dissolved from the cathode electrode sheet, thereby guaranteeing the permeability of the separator whilst protecting the anode electrode sheet, and improving the electrolyte solution impregnatability of the separator.

In any embodiment of a first aspect of the present application, the thickness value of the anode protection layer ranges from 3 μm to 5 μm.

In any embodiment of a first aspect of the present application, the thickness value of the anode protection layer ranges from 4 μm to 5 μm.

In any embodiment of a first aspect of the present application, the anode protection layer is further used for blocking growth of lithium dendrites. In these embodiments, the anode protection layer is not only used for capturing transition metal ions, but also further used for blocking growth of the lithium dendrites, thereby preventing deposition of dissolved lithium ions in the anode from formation of the lithium dendrites, avoiding puncture effects of the lithium dendrites on the composite separator, further guaranteeing safety of the electrochemical energy storage apparatus in the use process, and avoiding a battery short circuit.

In any embodiment of a first aspect of the present application, the anode protection layer further comprises: a first oxide nanoparticle capable of generating lithium oxide and a first elementary substance through a replacement reaction with metal lithium. The first oxide nanoparticle capable of having the replacement reaction with the metal lithium is designed in the anode protection layer, thereby blocking growth of the lithium dendrites, guaranteeing safety of the electrochemical energy storage apparatus in the use process, avoiding a battery short circuit, and extending battery life.

In any embodiment of a first aspect of the present application, the anode protection layer is a mixed layer comprising the complexing agent and the first oxide nanoparticle, where a weight ratio of the complexing agent to the first oxide nanoparticle is from 0.06 to 0.13.

In any embodiment of a first aspect of the present application, the thickness value of the anode protection layer ranges from 1 μm to 11 μm. In these embodiments, not only can the target ion, such as the lithium ion, be guaranteed to smoothly pass through the separator, but also growth of the lithium dendrites can be inhibited, thereby protecting the anode electrode sheet, guaranteeing permeability of the separator, and improving the electrolyte solution impregnatability of the separator.

In any embodiment of a first aspect of the present application, the thickness value of the anode protection layer ranges from 1 μm to 11 μm.

In any embodiment of a first aspect of the present application, the anode protection layer comprises: a first sublayer, where the complexing agent is distributed in the first sublayer, and the first sublayer is used for capturing transition metal ions; and a second sublayer stacked with the first sublayer, where the first oxide nanoparticle is distributed in the second sublayer.

In any embodiment of a first aspect of the present application, the thickness value of the anode protection layer ranges from 1 μm to 11 μm. In these embodiments, the composite separator has improved performance, has an ability to capture transition metal ions and block growth of the lithium dendrites, and further protects an anode electrode sheet of a secondary battery.

In any embodiment of a first aspect of the present application, the thickness value of the anode protection layer ranges from 2.5 μm to 9 μm.

In any embodiment of a first aspect of the present application, a thickness ratio of the first sublayer to the second sublayer is 1:2-4.

In any embodiment of a first aspect of the present application, a thickness value of the first sublayer ranges from 0.3 μm to 3.5 μm, and a thickness value of the second sublayer ranges from 0.6 μm to 7 μm.

In any embodiment of a first aspect of the present application, the first oxide nanoparticle comprises an oxide nanoparticle of at least one of silicon, zirconium, titanium, cadmium, manganese, iron, cobalt, nickel, aluminum, and copper.

In any embodiment of a first aspect of the present application, a particle diameter value of the first oxide nanoparticle ranges from 1 nm to 50 nm.

In any embodiment of a first aspect of the present application, the particle diameter value of the first oxide nanoparticle ranges from 1 nm to 10 nm. In these embodiments, the reaction rate of generating lithium oxide and the first elementary substance through the replacement reaction between the first oxide nanoparticle in the particle diameter range and the lithium dendrites is higher, thereby further avoiding growth of the lithium dendrites in dissolution and deposition processes of the charge-discharge cycle.

A second aspect of the present application further provides an electrochemical energy storage apparatus, comprising the composite separator in a first aspect of the present application.

A third aspect of the present application further provides an electrochemical energy storage apparatus, comprising: a cathode electrode sheet; an anode electrode sheet; and the composite separator comprising the anode protection layer, the first sublayer, and the second sublayer in a first aspect of the present application, where the first sublayer is arranged closer to the cathode electrode sheet than the second sublayer.

A fourth aspect of the present application further provides a new-energy vehicle, comprising the electrochemical energy storage apparatus in a second aspect or a third aspect of the present application.

Figure 1:
FIG. 1 is a schematic structural diagram of a composite separator layer in an embodiment of a first aspect of the present application.

DESCRIPTION OF REFERENCE NUMERALS battery pack—1; upper box body—2; lower box body—3; battery module—4;
secondary battery—5; case—51; electrode assembly—52; cover plate—53;
first base film—6; anode protection layer—7; first sublayer—71; second sublayer—72; and
second base film—8; and stability coating—9.

DETAILED DESCRIPTION

Embodiments of a composite separator, an electrochemical energy storage apparatus, and a new-energy vehicle of the present application are specifically disclosed below appropriately with reference to detailed description of the drawings. However, there will be cases where unnecessary detailed descriptions are omitted. For example, there are cases where detailed descriptions of well-known items and repeated descriptions of actually identical structures are omitted. This is to avoid unnecessary redundancy in the following descriptions and to facilitate the understanding by those skilled in the art. In addition, the drawings and subsequent descriptions are provided for those skilled in the art to fully understand the present application, and are not intended to limit the subject matter recited in the claims.

The "range" disclosed in the present application is defined in terms of lower and upper limits, and a given range is defined by selecting a lower limit and an upper limit, which define the boundaries of a particular range. A range defined in this manner may be inclusive or exclusive of end values, and may be arbitrarily combined, that is, any lower limit may be combined with any upper limit to form a range. For example, if the ranges of 60-120 and 80-110 are listed for a particular parameter, it is understood that the ranges of 60-110 and 80-120 are also contemplated. Additionally, if the minimum range values 1 and 2 are listed, and if the maximum range values 3, 4 and 5 are listed, the following ranges are all contemplated: 1-3, 1-4, 1-5, 2-3, 2-4 and 2-5. In the present application, unless stated otherwise, the numerical range "a-b" represents an abbreviated representation of any combination of real numbers between a to b, wherein both a and b are real numbers. For example, the numerical range "0-5" means that all real numbers between "0-5" have been listed herein, and "0-5" is just an abbreviated representation of the combination of these numerical values. Additionally, when it is stated that a certain parameter is an integer of ≥2, it is equivalent to disclosing that the parameter is, for example, an integer of 2, 3, 4, 5, 6, 7, 8, 9, 10, 11, 12, etc.

Unless otherwise specified, all embodiments and optional embodiments of the present application may be combined with each other to form new technical solutions.

Unless otherwise specified, all technical features and optional technical features of the present application may be combined with each other to form new technical solutions.

Unless otherwise specified, all steps of the present application may be performed sequentially or randomly, and preferably sequentially. For example, the method includes steps (a) and (b), meaning that the method may include steps (a) and (b) performed sequentially, or may include steps (b) and (a) performed sequentially. For example, the reference to the method may further comprise step (c), meaning that step (c) may be added to the method in any order, for example, the method may comprise steps (a), (b) and (c), or may comprise steps (a), (c) and (b), or may comprise steps (c), (a) and (b), and so on.

Unless otherwise specified, the terms "include/including" and "comprise/comprising" mentioned in the present application may be open-ended or closed-ended. For example, the "including" and "comprising" may indicate that it is possible to include or comprise other components not listed, and it is also possible to include or comprise only the listed components.

Unless otherwise specified, the term "or" is inclusive in the present application. By way of example, the phrase "A or B" means "A, B, or both A and B". More specifically, the condition "A or B" is satisfied under any one of the following conditions: A is true (or present) and B is false (or absent); A is false (or absent) and B is true (or present); or both A and B are true (or present).

The inventor finds in prolonged in-depth study that only a monolayer base film is used in a general separator, and a functional coating is coated on a surface of the monolayer base film to support the base film or remove hydrogen ions in an electrolyte solution. Because the functional coating is coated on a surface of the base film, during prolonged use of the separator, phenomena that the functional coating tends to fall off from the base film and powder tends to fall off from the coating greatly reduce the effectiveness of the functional coating on the separator, thereby affecting application performance of the electrochemical energy storage apparatus equipped with the separator.

In view of the discovery and analytical research of the above technical problems, the present application is presented.

As shown in FIG. 1, a first aspect of the present application provides a composite separator, comprising a first base film 6, a second base film 8, and an anode protection layer 7. The anode protection layer 7 is located between the first base film 6 and the second base film 8 in a thickness direction of the composite separator. The anode protection layer 7 is used for capturing transition metal ions.

Therefore, a first aspect of the present application provides the anode protection layer 7 for capturing transition metal ions between the first base film 6 and the second base film 8, such that the composite separator has a sandwich design to prevent the anode protection layer 7 from falling off from an outer surface of the base films during prolonged use with the help of sandwich and protection effects of the first base film 6 and the second base film 8 on the anode protection layer 7, and such that the anode protection layer 7 can have more stable anode protection effects in prolonged use of the electrochemical energy storage apparatus, and improve application performance of the electrochemical energy storage apparatus.

In some optional embodiments, the anode protection layer 7 comprises a complexing agent.

The complexing agent may be selected from at least one of a phosphate complexing agent, a hydroxycarboxylate complexing agent, and an aminocarboxylate complexing agent. The anode protection layer 7 comprises the complexing agent, to capture transition metals through a complexation reaction between the complexing agent and the transition metal ions dissolved from a cathode electrode sheet into an electrolyte solution, and prevent deposition of the dissolved transition metal ions in an anode electrode sheet from damaging a SEI.

The complexing agent in the embodiments of the present application may further comprise a general chelating agent. The complexing agent forms a compound of complex ions with metal ions, so that the complexing agent added in the anode protection layer 7 can capture the transition metal ions dissolved from the cathode electrode sheet, such as transition metal ions of, e.g., manganese, iron, and nickel, thereby preventing the deposition of the transition metal ions dissolved from the cathode electrode sheet in the anode of the electrochemical energy storage apparatus from damaging the SEI of the electrochemical energy storage apparatus.

The composite separator provided in a first aspect of the embodiments of the present application is applicable in a lithium-ion battery, and is an important component of the lithium-ion battery. The composite separator is arranged between the cathode electrode sheet and the anode electrode sheet of the lithium-ion battery, not only to prevent the occurrence of short circuit effects caused by contact of two electrode sheets with opposite electrical properties in the battery, but also to serve to conduct lithium ions.

In some examples, the first base film 6 and the second base film 8 may be selected from any one of polyethylene (PE) diaphragm, polypropylene (PP) diaphragm, non-woven fabric diaphragm, or polyimide diaphragm.

The first base film 6 and the second base film 8 are made of a same diaphragm material, or the first base film 6 and the second base film 8 are made of different diaphragm materials.

In some optional embodiments of a first aspect of the present application, the complexing agent is selected from at least one of disodium hydroxyethylidene diphosphonate, disodium ethylenediamine tetraacetate, tetrasodium ethylenediamine tetraacetate, hydroxyethylethylenediaminetriacetic acid, diethylenetriaminepentaacetic acid, citric acid, carboxymethyl tartaric acid, carboxymethyloxysuccinic acid, 1,2,3,4-cyclopentanetetracarboxylic acid, and sodium aminotriphosphate.

In some optional embodiments of the above examples, the complexing agent may be disodium hydroxyethylidene diphosphonate or disodium ethylenediamine tetraacetate.

In some optional embodiments of a first aspect of the present application, a thickness value of the anode protection layer 7 ranges from 0.5 μm to 8 μm. In these embodiments, not only can a target ion, such as a lithium ion, in the electrolyte solution be guaranteed to smoothly pass through the separator, but also the anode protection layer 7 can capture many transition metal ions, thereby guaranteeing permeability of the separator whilst protecting the anode electrode sheet, and improving electrolyte solution impregnatability of the separator.

In the embodiments of the present application, parameters reflecting performance of the composite separator include: MD (machine direction) shrinkage, TD (transverse direction) shrinkage, and needling strength.

In some optional embodiments of a first aspect of the present application, the thickness value of the anode protection layer 7 ranges from 3 μm to 5 μm. In these embodiments, the composite separator has large needling strength, and small MD (transverse direction) shrinkage, MD (transverse direction) elongation, TD (machine direction) shrinkage, and TD (transverse direction) elongation. In these embodiments, the composite separator may be applied in the electrochemical energy storage apparatus to further prevent a short circuit problem caused by contact between the cathode electrode sheet and the anode electrode sheet during the charge and discharge process, and further improve safety performance and service life of the electrochemical energy storage apparatus in the use process.

In some optional embodiments of a first aspect of the present application, the thickness value of the anode protection layer 7 ranges from 4 μm to 5 μm.

In some optional embodiments of a first aspect of the present application, the anode protection layer 7 is further used for blocking growth of lithium dendrites. In these embodiments, the anode protection layer 7 is not only used for capturing transition metal ions, but also further used for blocking growth of the lithium dendrites, thereby preventing anodic deposition of lithium ions dissolved from the cathode electrode sheet of the lithium-ion battery from formation of the lithium dendrites, avoiding puncture effects of the lithium dendrites on the composite separator, further guaranteeing safety of the electrochemical energy storage apparatus in the use process, and avoiding an internal short circuit of the battery.

In some optional embodiments of a first aspect of the present application, the anode protection layer 7 further comprises a first oxide nanoparticle. The first oxide nanoparticle is capable of generating lithium oxide and a first elementary substance through a replacement reaction with metal lithium. The first oxide nanoparticle capable of having the replacement reaction with the metal lithium is designed in the anode protection layer 7, thereby blocking growth of the lithium dendrites, guaranteeing safety of the electrochemical energy storage apparatus in the use process, avoiding a battery short circuit, and extending battery life.

In these embodiments, the generation of lithium oxide and the first elementary substance through the replacement reaction between the first oxide nanoparticle and the lithium metal is accompanied by reversible formation and decomposition processes of lithium oxide $Li_2O$, and is also accompanied by reduction and oxidation processes of the first oxide nanoparticle. The replacement reaction follows the replacement reaction model in equation 1, $$MO_x + 2xLi \leftrightarrow xLi_2O + M \qquad \text{equation 1.}$$

In equation 1, M is the first elementary substance corresponding to the first oxide. In these embodiments, nano-sized electrochemical driving characteristics of the first oxide nanoparticle enhance electrochemical reaction performance of the first oxide nanoparticle, thereby contributing to efficient displacement reaction in equation 1.

During the charge and discharge process of the electrochemical energy storage apparatus, at least a part of lithium dendrites are converted into lithium oxide through the replacement reaction between the first oxide nanoparticle arranged in the anode protection layer 7 and lithium dendrites growing and extending to the composite separator, thereby preventing infinite growth of the lithium dendrites in the anode electrode sheet, preventing the lithium dendrites from piercing the composite separator, avoiding an internal short circuit of the electrochemical energy storage apparatus, reducing electrolyte consumption, and improving cycle life of the electrochemical energy storage apparatus and coulomb efficiency of the electrochemical energy storage apparatus.

Figure 2:
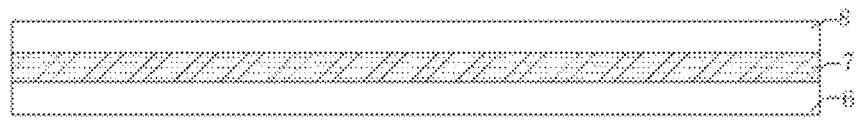
FIG. 2 is a schematic structural diagram of a composite separator layer in another embodiment of a first aspect of the present application.

As shown in FIG. 2, in some optional embodiments of a first aspect of the present application, the anode protection layer 7 is a mixed layer comprising the complexing agent and the first oxide nanoparticle, where a weight ratio of the complexing agent to the first oxide nanoparticle is from 0.06 to 0.13.

In some examples, the weight ratio of the complexing agent to the first oxide nanoparticle may be from 0.06 to 0.13. In these examples, the arrangement of the anode protection layer 7 can capture transition metal ions, inhibit and mitigate damage to a SEI caused by anodic deposition of dissolved transition metal ions, avoid negative impact of the transition metal ion deposition on battery performance such as self-discharge, cycle, and storage, prevent infinite growth of lithium dendrites on the anode electrode sheet, and improve the battery performance. The anode protection layer 7 is arranged between the two base films, thereby avoiding full contact between the base films and the electrolyte solution when the anode protection layer 7 peels off from the composite separator, and improving overall electrolyte impregnatability of the composite separator.

In some optional embodiments of a first aspect of the present application, the anode protection layer 7 is the mixed layer comprising the complexing agent and the first oxide nanoparticle, and the thickness value of the anode protection layer 7 ranges from 1 μm to 11 μm. In these embodiments, not only can the target ion, such as the lithium ion, be guaranteed to smoothly pass through the separator, but also growth of the lithium dendrites can be inhibited, thereby protecting the anode electrode sheet, and improving the electrolyte solution impregnatability of the separator.

In some optional embodiments of a first aspect of the present application, the anode protection layer 7 is the mixed layer comprising the complexing agent and the first oxide nanoparticle, and the thickness value of the anode protection layer 7 ranges from 2.5 μm to 9 μm. In these embodiments, not only can the target ion, such as the lithium ion, be guaranteed to smoothly pass through the separator, but also growth of the lithium dendrites can be inhibited, thereby protecting the anode electrode sheet, avoiding base film blockage, guaranteeing permeability of the separator, and improving the electrolyte solution impregnatability of the separator.

Figure 3:
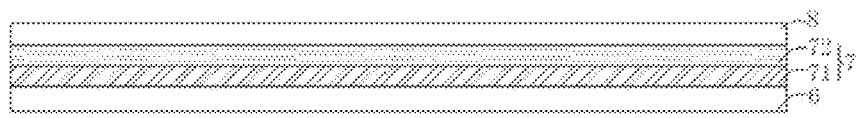
FIG. 3 is a schematic structural diagram of a composite separator layer in still another embodiment of a first aspect of the present application.

As shown in FIG. 3, in some optional embodiments of a first aspect of the present application, the anode protection layer 7 comprises a first sublayer 71 and a second sublayer 72. The complexing agent is distributed in the first sublayer 71, and the first sublayer 71 is used for capturing transition metal ions. The second sublayer 72 is stacked with the first sublayer 71, and the first oxide nanoparticle is distributed in the second sublayer 72.

In some optional embodiments of a first aspect of the present application, the thickness value of the anode protection layer 7 ranges from 1 μm to 11 μm. In these embodiments, the thickness of the anode protection layer 7 is the sum of the thickness of the first sublayer 71 and the thickness of the second sublayer 72.

In some optional embodiments of a first aspect of the present application, a thickness ratio of the first sublayer 71 to the second sublayer 72 is 1:2-4.

In some optional embodiments of a first aspect of the present application, the thickness ratio of the first sublayer 71 to the second sublayer 72 is 1:2.

In some optional embodiments of a first aspect of the present application, a thickness value of the first sublayer 71 ranges from 0.3 μm to 3.5 μm, and a thickness value of the second sublayer 72 ranges from 0.6 μm to 7 μm.

In some optional embodiments of a first aspect of the present application, the first oxide nanoparticle comprises an oxide nanoparticle of at least one of silicon, zirconium, titanium, cadmium, manganese, iron, cobalt, nickel, aluminum, and copper.

In some optional embodiments of a first aspect of the present application, a particle diameter value of the first oxide nanoparticle ranges from 1 nm to 50 nm. In these embodiments, the reaction rate of generating lithium oxide and the first elementary substance through the replacement reaction between the first oxide nanoparticle in the particle diameter range and the lithium dendrites is high, thereby avoiding growth of the lithium dendrites in dissolution and deposition processes of the charge-discharge cycle.

In some optional embodiments of a first aspect of the present application, the particle diameter value of the first oxide nanoparticle ranges from 1 nm to 10 nm. In these embodiments, the reaction rate of generating lithium oxide and the first elementary substance through the replacement reaction between the first oxide nanoparticle in the particle diameter range and the lithium dendrites is higher, thereby further avoiding growth of the lithium dendrites in dissolution and deposition processes of the charge-discharge cycle.

Figure 4:
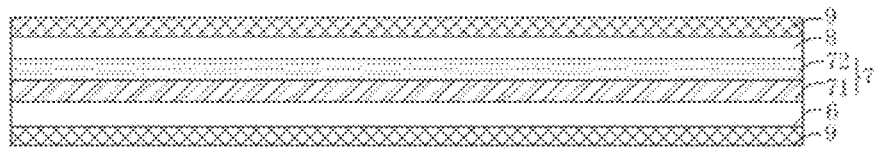
FIG. 4 is a schematic structural diagram of a composite separator layer in yet another embodiment of a first aspect of the present application.

As shown in FIG. 4, in some optional embodiments of a first aspect of the present application, at least one of two surfaces opposite in the thickness direction of the composite separator is provided with a stability coating 9. The stability coating 9 is used for enhancing thermal stability of the composite separator, and improving overall mechanical strength of the composite separator, thus improving the electrochemical energy storage apparatus, and preventing a short circuit in the electrochemical energy storage apparatus caused by thermal shrinkage of the composite separator. The stability coating 9 enhances the mechanical strength of the composite separator, improves reliability and safety performance of the battery, and improves safety performance and temperature resistance in prolonged cycles of the electrochemical energy storage apparatus.

In some examples, the stability coating 9 comprises boehmite particles.

A second aspect of the embodiments of the present application further provides an electrochemical energy storage apparatus, comprising the composite separator in a first aspect of the present application.

In some optional embodiments, the electrochemical energy storage apparatus is a secondary battery. The secondary battery pack comprises a positive electrode sheet (i.e., cathode electrode sheet), a negative electrode sheet (i.e., anode electrode sheet), an electrolyte, and a separator. During the charge and discharge process of the battery, active ions intercalate and deintercalate back and forth between the positive electrode sheet and the negative electrode sheet. The electrolyte serves to conduct ions between the positive electrode sheet and the negative electrode sheet. The separator is provided between the positive electrode sheet and the negative electrode sheet, and mainly functions to prevent a short circuit between the positive electrode and the negative electrode while allowing ions to pass through.

[Positive Electrode Sheet]

The positive electrode sheet comprises a positive electrode current collector and a positive electrode film layer arranged on at least one surface of the positive electrode current collector, and the positive electrode film layer comprises the positive electrode active material in a first aspect of the present application.

As an embodiment, the positive electrode current collector has two surfaces opposite in its own thickness direction, and the positive electrode film layer is arranged on either one or both of the two opposite surfaces of the positive electrode current collector.

In some embodiments, the positive electrode current collector can be a metal foil or a composite current collector. For example, an aluminum foil can be used as the metal foil. The composite current collector can comprise a high molecular material substrate layer and a metal layer formed on at least one surface of the high molecular material substrate layer. The composite current collector may be formed by forming a metal material (such as aluminum, aluminum alloy, nickel, nickel alloy, titanium, titanium alloy, silver, and silver alloy) on a high molecular material base film (such as polypropylene (PP), polyethylene terephthalate (PET), polybutylene terephthalate (PBT), polystyrene (PS), or polyethylene (PE) base film).

In some embodiments, a positive electrode active material for a battery well-known in the art may be used as the positive electrode active material. As an example, the positive electrode active material may include at least one of the following materials: a lithium-containing phosphate of olivine structure, a lithium transition metal oxide, and a respective modified compound thereof. However, the present application is not limited to these materials, and other conventional materials useful as positive electrode active materials for batteries can also be used. These positive electrode active materials may be used alone or in combination of two or more thereof. Among them, examples of lithium transition metal oxides may include, but are not limited to, at least one of a lithium-cobalt oxide (such as $LiCoO_2$), a lithium-nickel oxide (such as $LiNiO_2$), a lithium-manganese oxide (such as $LiMnO_2$ and $LiMn_2O_4$), a lithium-nickel-cobalt oxide, a lithium-manganese-cobalt oxide, a lithium-nickel-manganese oxide, a lithium-nickel-cobalt-manganese oxide (such as $LiNi_{1/3}Co_{1/3}Mn_{1/3}O_2$ (also referred to as $NCM_{333}$), $LiNi_{0.5}Co_{0.2}Mn_{0.3}O_2$ (also referred to as $NCM_{523}$), $LiNi_{0.5}Co_{0.25}Mn_{0.25}O_2$ (may also be abbreviated as $NCM_{211}$), $LiNi_{0.6}Co_{0.2}Mn_{0.2}O_2$ (may also be abbreviated as $NCM_{622}$), $LiNi_{0.8}Co_{0.1}Mn_{0.1}O_2$ (also referred to as $NCM_{811}$)), a lithium-nickel-cobalt-aluminum oxide (such as $LiNi_{0.85}Co_{0.15}Al_{0.05}O_2$) and a modified compound thereof. Examples of the lithium-containing phosphate of olivine structure may include, but are not limited to, at least one of lithium iron phosphate (such as LiFePO$_4$ (also referred to as LFP)), a composite material of lithium iron phosphate and carbon, lithium manganese phosphate (such as LiMnPO$_4$), a composite material of lithium manganese phosphate and carbon, lithium iron manganese phosphate, and a composite material of lithium manganese iron phosphate and carbon.

In some embodiments, the positive electrode film layer further optionally comprises a binder. As an example, the binder may comprise at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluoroacrylate resin.

In some embodiments, the positive electrode film layer further optionally comprises a conductive agent. As an example, the conductive agent may comprise at least one of superconducting carbon, acetylene black, carbon black, Ketjen black, carbon dot, carbon nanotube, graphene, and carbon nanofiber.

In some embodiments, the positive electrode sheet may be prepared as follows: the above ingredients, such as the positive electrode active material, the conductive agent, the binder, and any other ingredient, for preparing the positive electrode sheet are dispersed in a solvent (such as N-methyl pyrrolidone) to form a positive electrode slurry; and the positive electrode slurry is coated on the positive electrode current collector, dried, and cold pressed, to obtain the positive electrode sheet.

[Negative Electrode Sheet]

The negative electrode sheet comprises a negative electrode current collector and a negative electrode film layer arranged on at least one surface of the negative electrode current collector, and the negative electrode film layer comprises a negative electrode active material.

As an example, the negative electrode current collector has two surfaces opposite in its own thickness direction, and the negative electrode film layer is arranged on either one or both of the two opposite surfaces of the negative electrode current collector.

In some embodiments, the negative electrode current collector can be a metal foil or a composite current collector. For example, a copper foil can be used as the metal foil. The composite current collector may comprise a high molecular material substrate layer and a metal layer formed on at least one surface of the high molecular material base film. The composite current collector may be formed by forming a metal material (such as copper, copper alloy, nickel, nickel alloy, titanium, titanium alloy, silver, and silver alloy) on a high molecular material base film (such as polypropylene (PP), polyethylene terephthalate (PET), polybutylene terephthalate (PBT), polystyrene (PS), or polyethylene (PE) base film).

In some embodiments, a negative electrode active material for a battery well-known in the art may be used as the negative electrode active material. As an example, the negative electrode active material may include at least one of the following materials: artificial graphite, natural graphite, soft carbon, hard carbon, silicon-based film material, tin-based film material, lithium titanate, and the like. The silicon-based film material may be selected from at least one of elementary silicon, silicon-oxygen compound, silicon-carbon composite, silicon-nitrogen composite, and silicon alloy. The tin-based film material may be selected from at least one of elementary tin, tin-oxygen compound, and tin alloy. However, the present application is not limited to these materials, and other conventional materials useful as negative electrode active materials for batteries can also be used. These negative electrode active materials may be used alone or in combination of two or more thereof.

In some embodiments, the negative electrode film layer further optionally comprises a binder. The binder may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally comprises a conductive agent. The conductive agent may be selected from at least one of superconducting carbon, acetylene black, carbon black, Ketjen black, carbon dot, carbon nanotube, graphene, and carbon nanofiber.

In some embodiments, the negative electrode film layer further optionally comprises other adjuvants, for example, a thickener (such as sodium carboxymethyl cellulose (CMC-Na)).

In some embodiments, the negative electrode sheet may be prepared as follows: the above ingredients, such as the negative electrode active material, the conductive agent, the binder, and any other ingredient, for preparing the negative electrode sheet are dispersed in a solvent (such as deionized water) to form a negative electrode slurry; and the negative electrode slurry is coated on the negative electrode current collector, dried, and cold pressed, to obtain the negative electrode sheet.

[Electrolyte]

The electrolyte serves to conduct ions between the positive electrode sheet and the negative electrode sheet. The type of the electrolyte is not particularly limited in the present application, and can be selected according to requirements. For example, the electrolyte may be in a liquid, gel, or full solid state.

In some embodiments, an electrolyte solution is used as the electrolyte. The electrolyte solution comprises an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoro (oxalato)borate, lithium bis(oxalate)borate, lithium difluoro bis(oxalato)phosphate, and lithium tetrafluoro(oxalato) phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate ethyl propionate, propyl propionate, methyl butyrate, ethyl butyrate, 1,4-butyrolactone, sulfolane, methylsulfonylmethane, ethyl methyl sulfone and ethylsulfonylethane.

In some embodiments, the electrolyte solution further optionally comprises an additive. For example, the additive may include a negative electrode film-forming additive or a positive electrode film-forming additive, or may further include an additive that can improve some performance of the battery, such as an additive that improves overcharge performance of the battery or an additive that improves high-temperature or low-temperature performance of the battery.

In some embodiments, the positive electrode sheet, the negative electrode sheet, and the composite separator may be made into an electrode assembly by a winding process or a stacking process.

In some embodiments, the secondary battery may comprise an outer package. The outer package can be used to encapsulate the above-mentioned electrode assembly and electrolyte.

In some embodiments, the outer package of the secondary battery may be a hard case, such as a hard plastic case, an aluminum case, a steel case, and the like. The outer package of the secondary battery may also be a soft pack, such as a bag-type soft pack. The material of the soft pack may be a plastic, and examples of the plastic include polypropylene, polybutylene terephthalate and polybutylene succinate, etc.

Figure 5:
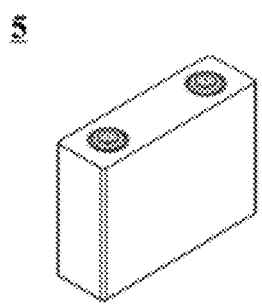
FIG. 5 is a schematic diagram of a secondary battery of square structure in an example of a second aspect of the present application.

The shape of the secondary battery is not particularly limited in the present application, and may be a cylinder, a square, or any other shape. For example, FIG. 5 is a secondary battery 5 of square structure as an example.

Figure 6:
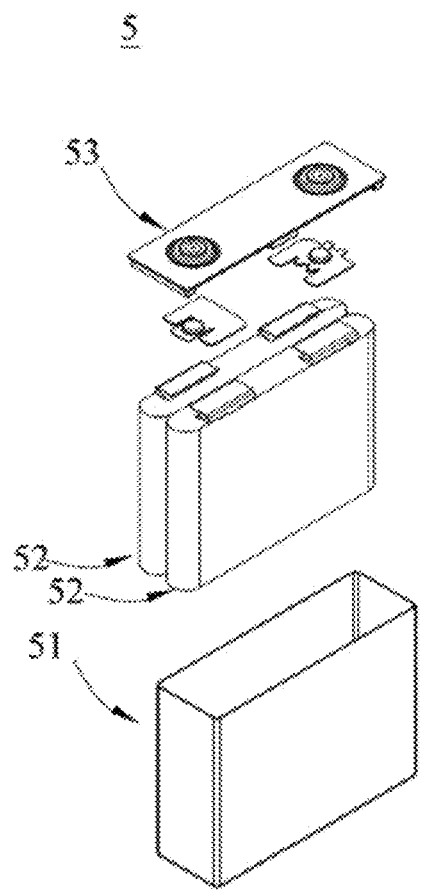
FIG. 6 is an exploded view of the secondary battery shown in FIG. 5.

In some embodiments, referring to FIG. 6, the outer package may comprise a case 51 and a cover plate 53. Here, the case 51 can include a bottom plate and a side plate connected to the bottom plate, with the bottom plate and the side plate enclosing to form an accommodating cavity. The case 51 has an opening that communicates with the accommodating cavity, and the cover plate 53 can cover the opening to close the accommodating cavity. The positive electrode sheet, the negative electrode sheet, and the composite separator can form an electrode assembly 52 by a winding process or a stacking process. The electrode assembly 52 is encapsulated within the accommodating cavity. The electrolyte solution impregnates the electrode assembly 52. The number of electrode assemblies 52 comprised in the secondary battery 5 may be one or more, and may be selected by those skilled in the art according to specific actual requirements.

In some embodiments, the secondary batteries may be assembled into a battery module, the number of secondary batteries comprised in the battery module may be one or more, and the specific number may be selected by those skilled in the art based on the application and capacity of the battery module.

Figure 7:
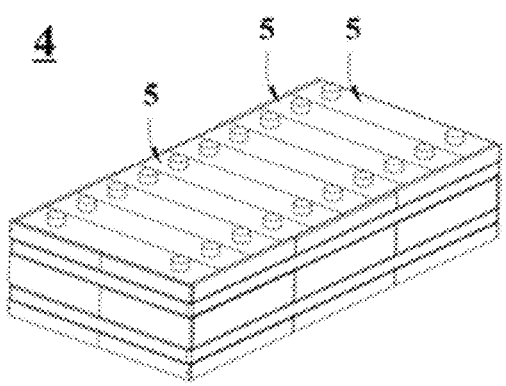
FIG. 7 is a schematic diagram of a battery module in an embodiment of the present application.

FIG. 7 is a battery module 4 as an example. Referring to FIG. 7, in the battery module 4, a plurality of secondary batteries 5 may be sequentially arranged along a length direction of the battery module 4, and of course, may also be arranged in any other manner. The plurality of secondary batteries 5 may further be fixed by fasteners.

Optionally, the battery module 4 may further include a shell having an accommodating space, in which the plurality of secondary batteries 5 are accommodated.

In some embodiments, the battery modules may be further assembled into a battery pack, the number of battery modules comprised in the battery pack may be one or more, and the specific number may be selected by those skilled in the art based on the application and capacity of the battery pack.

Figure 8:
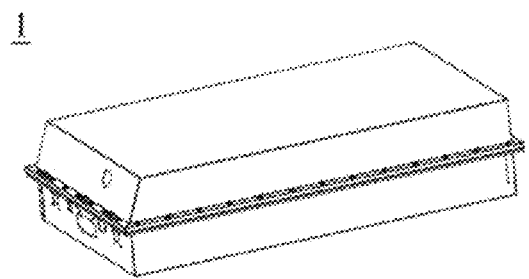
FIG. 8 is a schematic diagram of a battery pack in an embodiment of the present application.
Figure 9:
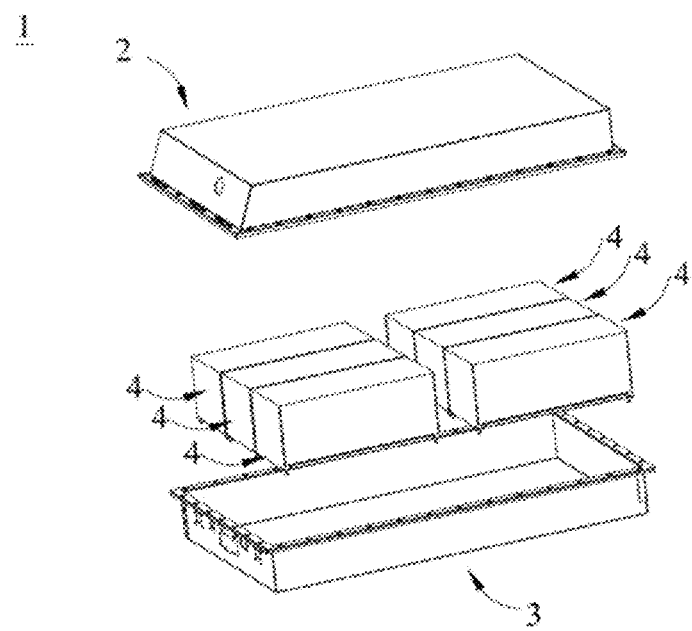
FIG. 9 is an exploded view of the battery pack shown in FIG. 8.

FIG. 8 and FIG. 9 are a battery pack 1 as an example. Referring to FIGS. 8 and 9, the battery pack 1 can include a battery box and a plurality of battery modules 4 provided in the battery box. The battery box includes an upper box body 2 and a lower box body 3, where the upper box body 2 can cover the lower box body 3 and forms an enclosed space for accommodating the battery module 4. The plurality of battery modules 4 may be arranged in the battery box in any manner.

A third aspect of the embodiments of the present application further provides an electrochemical energy storage apparatus, comprising a cathode electrode sheet, an anode electrode sheet, and a composite separator. The composite separator is a composite separator comprising the anode protection layer, the first sublayer, and the second sublayer in a first aspect of the present application, where the first sublayer is arranged closer to the cathode electrode sheet than the second sublayer.

In these optional embodiments, because the complexing agent is distributed in the first sublayer, the first sublayer is arranged closer to the cathode electrode sheet, to more efficiently and promptly capture transition metal ions dissolved from the cathode electrode sheet, and prevent deposition of the transition metal ions towards the anode electrode sheet from affecting a SEI of the anode electrode sheet. The second sublayer is arranged closer to the anode electrode sheet than the first sublayer, the second sublayer first contacts an extended end portion of lithium dendrites growing on the anode electrode sheet, and a replacement reaction between the first oxide nanoparticle in the second sublayer and the lithium dendrites inhibits growth of the lithium dendrites from the anode electrode sheet to the cathode electrode sheet, avoids an internal short circuit of the electrochemical energy storage apparatus, and improves application safety performance of the electrochemical energy storage apparatus.

A fourth aspect of the present application further provides a new-energy vehicle, comprising the electrochemical energy storage apparatus in a second aspect or a third aspect of the present application.

In addition, the present application further provides an electrical apparatus, comprising at least one of the secondary battery, the battery module, or the battery pack provided in the present application. The secondary battery, battery module, or battery pack can be used as a power source for the electrical apparatus, and can also be used as an energy storage unit for the electrical apparatus. The electrical apparatus may include, but is not limited to, a mobile device (such as a mobile phone, and a laptop, etc.), an electric vehicle (such as an all-electric vehicle, a hybrid electric vehicle, a plug-in hybrid electric vehicle, an electric bicycle, an electric scooter, an electric golf cart, and an electric truck, etc.), an electric train, a ship, a satellite, and an energy storage system, etc.

The secondary battery, the battery module, or the battery pack may be selected for the electrical apparatus based on use demand thereof.

Figure 10:
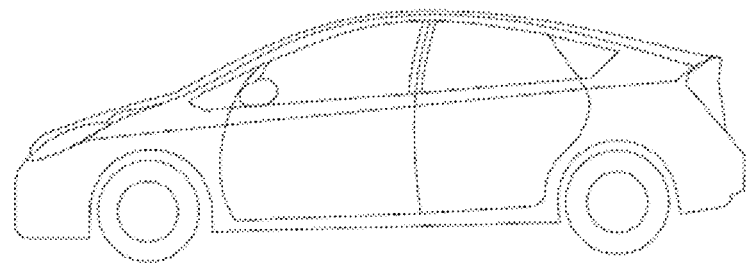
FIG. 10 is a schematic diagram of an electrical apparatus in an embodiment of a third aspect of the present application.

FIG. 10 shows an electrical apparatus as an example. The electrical apparatus is, e.g., an all-electric vehicle, a hybrid electric vehicle, or a plug-in hybrid electric vehicle. In order to meet the requirements of the electrical apparatus for high power and high energy density of secondary batteries, a battery pack or a battery module may be used.

As another example, the apparatus may be a mobile phone, a tablet, a laptop, etc. The apparatus is generally required to be light and thin, and may use a secondary battery as a power source.

EMBODIMENTS

Embodiments of the present application will be described hereinafter. The embodiments described below are illustrative, are merely used to explain the present application, and should not be construed as limitation on the present application. Where specific techniques or conditions are not specified in the embodiments, the techniques or conditions described in the literatures of the art or the product specifications are followed. Where manufacturers are not specified, the reagents or instruments used are conventional products and are commercially available.

Embodiment 1

Preparation of a Slurry for an Anode Protection Layer

Ingredients in slurry formula of Embodiment 1 shown in Table 1 below were added into a stirring apparatus, and sufficiently stirred to obtain the slurry. The slurry in Embodiment 1 comprises: 100 parts of ionized water, 0.4 parts of arylphenyl polyethoxylene ether surfactant as a dispersant, 0.5 parts of sodium carboxymethyl cellulose as a thickener, 2 parts of water-borne acrylate emulsion as a binder, and 5 parts of tetrasodium ethylenediamine tetraacetate as a complexing agent.

Preparation of a Separator

A first base film and a second base film were made of a porous polyethylene (PE) film. The thickness of the first base film is equal to the thickness of the second base film. The sum of the thickness of the first base film and the thickness of the second base film is 14 μm. The thickness of a single first base film or a single second base film is 7 μm.

The above resulting slurry for the anode protection layer was coated on one side of the first base film, and the second base film was provided on the coating. The first base film, the anode protection layer, and the second base film were composited into a composite separator with a sandwich structure using binding effects of the binder in the slurry for the anode protection layer, and the thickness of the anode protection layer is 0.5 μm.

Preparation of a Negative Electrode Sheet (Anode Electrode Sheet)

A negative electrode active material (artificial graphite), a binder styrene (styrene butadiene rubber (SBR)), a thickener (sodium carboxymethyl cellulose (CMC-Na)), and a conductive agent (carbon black (Super P)) at a weight ratio of 96.2:1.8:1.2:0.8 were sufficiently stirred and mixed in an appropriate amount of a solvent (deionized water), to form a homogeneous negative electrode slurry. The negative electrode slurry was homogeneously coated on a surface of a negative electrode current collector (copper foil), dried, cold pressed, side cut, sliced, and striped, to obtain the negative electrode sheet.

Preparation of a Positive Electrode Sheet (Cathode Electrode Sheet)

A positive electrode active material ($LiNi_{0.8}Co_{0.1}Mn_{0.1}O_2$ (NCM811)), a conductive agent (carbon nanotube (CNT)), a conductive agent (carbon black (Super P)), and a binder (polyvinylidene fluoride (PVDF)) at a weight ratio of 96.9:0.3:1.7:1.0 were sufficiently stirred and mixed in an appropriate amount of a solvent (NMP), to form a homogeneous positive electrode slurry. The positive electrode slurry was homogeneously coated on a surface of a positive electrode current collector (aluminum foil), dried, cold pressed, side cut, sliced, and striped, to obtain the positive electrode sheet.

Preparation of an Electrolyte Solution

A baseline electrolyte solution was prepared. The baseline electrolyte comprises dimethyl carbonate (DMC), ethyl methyl carbonate (EMC), and ethylene carbonate (EC) at a mass ratio of 5:2:3. Then, an electrolyte salt was added such that lithium hexafluorophosphate in the electrolyte solution was at a concentration of 1 mol/L.

Preparation of a Secondary Battery

The above resulting positive electrode sheet, the composite separator, and the negative electrode sheet were sequentially stacked and winded to obtain an electrode assembly. The electrode assembly was placed in an outer package, into which the electrolyte solution was added, and the secondary battery was obtained through the processes, such as encapsulation, standing, formation, and aging.

Embodiment 2-Embodiment 15

The method for preparing a secondary battery in Embodiment 2-Embodiment 15 is similar to that in Embodiment 1, except that the formula of the slurry for the anode protection layer and the structure parameters of the composite separator were adjusted. The formula of the slurry for the anode protection layer in each Embodiment is detailed in Table 1, and the structure parameters of the composite separator in each Embodiment are detailed in Table 2.

Embodiment 16

Preparation of a Slurry for an Anode Protection Layer

Ingredients in a formula of a slurry for a first sublayer in Embodiment 16 shown in Table 1 below were added into a first stirring apparatus, and sufficiently stirred to obtain the prepared slurry for the first sublayer. The slurry for the first sublayer in Embodiment 16 comprises: 100 parts of ionized water, 0.8 parts of arylphenyl polyethoxylene ether surfactant as a dispersant, 0.5 parts of sodium carboxymethyl cellulose as a thickener, 2 parts of water-borne acrylate emulsion as a binder, and 5 parts of tetrasodium ethylenediamine tetraacetate as a complexing agent.

Ingredients in a formula of a slurry for a second sublayer in Embodiment 16 shown in Table 1 below were added into a second stirring apparatus, and sufficiently stirred to obtain the slurry for the second sublayer. The slurry for the second sublayer in Embodiment 16 comprises: 100 parts of ionized water, 0.8 parts of arylphenyl polyethoxylene ether surfactant as a dispersant, 0.5 parts of sodium carboxymethyl cellulose as a thickener, 5 parts of water-borne acrylate emulsion as a binder, and 80 parts of $SiO_2$ nanoparticle as a first oxide nanoparticle.

Preparation of a Separator

A first base film and a second base film were made of a porous polyethylene (PE) film. The thickness of the first base film is equal to the thickness of the second base film. The sum of the thickness of the first base film and the thickness of the second base film is 14 μm. The thickness of a single first base film or a single second base film is 7 μm.

The above resulting slurry for the first sublayer was coated on one side of the first base film, and after the slurry was dried to form the first sublayer by film formation, the above resulting slurry for the second sublayer was coated on a surface of one side of the first sublayer back facing the first base film to form the second sublayer. The thickness of the first sublayer is 0.33 μm, and the thickness of the second sublayer is 0.67 μm. The first base film, the anode protection layer comprising the first sublayer and the second sublayer, and the second base film were composited into a composite separator with a sandwich structure using binding effects of the binders in the slurry for the first sublayer and the slurry for the second sublayer, and the thickness of the anode protection layer is 1 μm.

The preparation of the positive electrode sheet, the negative electrode sheet, and the electrolyte solution is the same as that in Embodiment 1, and the description will not be repeated here.

Preparation of a Secondary Battery

The above resulting positive electrode sheet, the composite separator, and the negative electrode sheet were sequentially stacked and winded to obtain an electrode assembly, where the first sublayer was arranged closer to the positive electrode sheet (cathode electrode sheet) than the second sublayer, i.e., the first base film was arranged in contact with the positive electrode sheet, and the second base film was arranged in contact with the negative electrode sheet. The above resulting electrode assembly was placed in an outer package, into which the electrolyte solution was added, and the secondary battery was obtained through the processes, such as encapsulation, standing, formation, and aging.

Embodiment 17-Embodiment 21

The method for preparing a secondary battery in Embodiment 17 to Embodiment 21 is similar to that in Embodiment 16, except that the formula of the slurry for the anode protection layer and the structure parameters of the composite separator were adjusted. The formula of the slurry for the anode protection layer in each Embodiment is detailed in Table 1, and the structure parameters of the composite separator in each Embodiment are detailed in Table 2.

Comparative Embodiment 1

The method for preparing a secondary battery in Comparative Embodiment 1 is similar to that in Embodiment 1, except that there was no preparation of the slurry for the anode protection layer, and the first base film was directly binded to the second base film using a binder during the preparation of the separator without arrangement of the anode protection layer between the first base film and the second base film.

Comparative Embodiment 2

The method for preparing a secondary battery in Comparative Embodiment 2 is similar to that in Embodiment 1, except that in the process of preparing the separator, the slurry for the anode protection layer was coated on a single base film to form the anode protection layer without sandwiching an anode protection layer between the two base films.

Table 1 shows the formula of the slurry for the anode protection layer in Embodiment 1-Embodiment 21 and Comparative Embodiment 1-Comparative Embodiment 2.

TABLE 1

| No. | Deionized water | Dispersant | Amount of dispersant | Thickener | Amount of thickener | Binder | Amount of binder | Complexing agent | Amount of complexing agent | First oxide nanoparticle | Amount of first oxide nanoparticle |
|---|---|---|---|---|---|---|---|---|---|---|---|
| Embodiment 1 | 100 parts | Arylphenyl polyethoxylene ether surfactant | 0.4 parts | Sodium carboxymethyl cellulose | 0.5 parts | Waterborne acrylate emulsion | 2 parts | tetrasodium ethylenediamine tetraacetate | 5 parts | / | / |
| Embodiment 2 | 100 parts | Arylphenyl polyethoxylene ether surfactant | 0.4 parts | Sodium carboxymethyl cellulose | 0.5 parts | Waterborne acrylate emulsion | 2 parts | Sodium bismetaphosphate | 5 parts | / | / |
| Embodiment 3 | 100 parts | Arylphenyl polyethoxylene ether surfactant | 0.4 parts | Sodium carboxymethyl cellulose | 0.5 parts | Waterborne acrylate emulsion | 2 parts | 2-hydroxyimino diacetic acid | 5 parts | / | / |
| Embodiment 4 | 100 parts | Arylphenyl polyethoxylene ether surfactant | 0.4 parts | Sodium carboxymethyl cellulose | 0.5 parts | Waterborne acrylate emulsion | 2 parts | tetrasodium ethylenediamine tetraacetate | 5 parts | / | / |
| Embodiment 5 | 100 parts | Arylphenyl polyethoxylene ether surfactant | 0.4 parts | Sodium carboxymethyl cellulose | 0.5 parts | Waterborne acrylate emulsion | 2 parts | tetrasodium ethylenediamine tetraacetate | 5 parts | / | / |
| Embodiment 6 | 100 parts | Arylphenyl polyethoxylene ether surfactant | 0.4 parts | Sodium carboxymethyl cellulose | 0.5 parts | Waterborne acrylate emulsion | 2 parts | tetrasodium ethylenediamine tetraacetate | 5 parts | / | / |
| Embodiment 7 | 100 parts | Arylphenyl polyethoxylene ether surfactant | 0.8 parts | Sodium carboxymethyl cellulose | 0.4 parts | Waterborne acrylate emulsion | 5 parts | tetrasodium ethylenediamine tetraacetate | 5 parts | $SiO_2$ | 80 parts |
| Embodiment 8 | 100 parts | Arylphenyl polyethoxylene ether surfactant | 0.8 parts | Sodium carboxymethyl cellulose | 0.4 parts | Waterborne acrylate emulsion | 5 parts | tetrasodium ethylenediamine tetraacetate | 5 parts | $SiO_2$ | 80 parts |
| Embodiment 9 | 100 parts | Arylphenyl polyethoxylene ether surfactant | 0.8 parts | Sodium carboxymethyl cellulose | 0.4 parts | Waterborne acrylate emulsion | 5 parts | tetrasodium ethylenediamine tetraacetate | 5 parts | $SiO_2$ | 80 parts |
| Embodiment 10 | 100 parts | Arylphenyl polyethoxylene ether surfactant | 0.8 parts | Sodium carboxymethyl cellulose | 0.4 parts | Waterborne acrylate emulsion | 5 parts | tetrasodium ethylenediamine tetraacetate | 5 parts | $SiO_2$ | 80 parts |

TABLE 1-continued

| No. | Deionized water | Dispersant | Amount of dispersant | Thickener | Amount of thickener | Binder | Amount of binder | Complexing agent | Amount of complexing agent | First oxide nanoparticle | Amount of first oxide nanoparticle |
|---|---|---|---|---|---|---|---|---|---|---|---|
| Embodiment 11 | 100 parts | Arylphenyl polyethoxylene ether surfactant | 0.8 parts | Sodium carboxymethyl cellulose | 0.4 parts | Water-borne acrylate emulsion | 5 parts | tetrasodium ethylenediamine tetraacetate | 5 parts | $SiO_2$ | 80 parts |
| Embodiment 12 | 100 parts | Arylphenyl polyethoxylene ether surfactant | 0.8 parts | Sodium carboxymethyl cellulose | 0.4 parts | Water-borne acrylate emulsion | 5 parts | tetrasodium ethylenediamine tetraacetate | 5 parts | $SiO_2$ | 70 parts |
| Embodiment 13 | 100 parts | Arylphenyl polyethoxylene ether surfactant | 0.8 parts | Sodium carboxymethyl cellulose | 0.4 parts | Water-borne acrylate emulsion | 5 parts | tetrasodium ethylenediamine tetraacetate | 5 parts | $SiO_2$ | 60 parts |
| Embodiment 14 | 100 parts | Arylphenyl polyethoxylene ether surfactant | 0.8 parts | Sodium carboxymethyl cellulose | 0.4 parts | Water-borne acrylate emulsion | 5 parts | tetrasodium ethylenediamine tetraacetate | 5 parts | $SiO_2$ | 40 parts |
| Embodiment 15 | 100 parts | Arylphenyl polyethoxylene ether surfactant | 0.8 parts | Sodium carboxymethyl cellulose | 0.4 parts | Water-borne acrylate emulsion | 5 parts | tetrasodium ethylenediamine tetraacetate | 5 parts | $Al_2O_3$ | 80 parts |
| Embodiment 16 First sublayer | 100 parts | Arylphenyl polyethoxylene ether surfactant | 0.8 parts | Sodium carboxymethyl cellulose | 0.5 parts | Water-borne acrylate emulsion | 2 parts | tetrasodium ethylenediamine tetraacetate | 5 parts | / | / |
| Embodiment 16 Second sublayer | 100 parts | Arylphenyl polyethoxylene ether surfactant | 0.8 parts | Sodium carboxymethyl cellulose | 0.5 parts | Water-borne acrylate emulsion | 5 parts | / | / | $SiO_2$ | 80 parts |
| Embodiment 17 First sublayer | 100 parts | Arylphenyl polyethoxylene ether surfactant | 0.8 parts | Sodium carboxymethyl cellulose | 0.5 parts | Water-borne acrylate emulsion | 2 parts | tetrasodium ethylenediamine tetraacetate | 5 parts | / | / |
| Embodiment 17 Second sublayer | 100 parts | Arylphenyl polyethoxylene ether surfactant | 0.8 parts | Sodium carboxymethyl cellulose | 0.5 parts | Water-borne acrylate emulsion | 5 parts | / | / | $SiO_2$ | 80 parts |
| Embodiment 18 First sublayer | 100 parts | Arylphenyl polyethoxylene ether surfactant | 0.8 parts | Sodium carboxymethyl cellulose | 0.5 parts | Water-borne acrylate emulsion | 2 parts | tetrasodium ethylenediamine tetraacetate | 5 parts | / | / |
| Embodiment 18 Second sublayer | 100 parts | Arylphenyl polyethoxylene ether surfactant | 0.8 parts | Sodium carboxymethyl cellulose | 0.5 parts | Water-borne acrylate emulsion | 5 parts | / | / | $SiO_2$ | 80 parts |
| Embodiment 19 First sublayer | 100 parts | Arylphenyl polyethoxylene ether surfactant | 0.8 parts | Sodium carboxymethyl cellulose | 0.5 parts | Water-borne acrylate emulsion | 2 parts | tetrasodium ethylenediamine tetraacetate | 5 parts | / | 1/ |
| Embodiment 19 Second sublayer | 100 parts | Arylphenyl polyethoxylene ether surfactant | 0.8 parts | Sodium carboxymethyl cellulose | 0.5 parts | Water-borne acrylate emulsion | 5 parts | / | / | $SiO_2$ | 80 parts |
| Embodiment 20 First sublayer | 100 parts | Arylphenyl polyethoxylene ether surfactant | 0.8 parts | Sodium carboxymethyl cellulose | 0.5 parts | Water-borne acrylate emulsion | 2 parts | tetrasodium ethylenediamine tetraacetate | 5 parts | / | / |
| Embodiment 20 Second sublayer | 100 parts | Arylphenyl polyethoxylene ether surfactant | 0.8 parts | Sodium carboxymethyl cellulose | 0.5 parts | Water-borne acrylate emulsion | 5 parts | / | / | $SiO_2$ | 80 parts |
| Embodiment 20 First sublayer | 100 parts | Arylphenyl polyethoxylene ether surfactant | 0.8 parts | Sodium carboxymethyl cellulose | 0.5 parts | Water-borne acrylate emulsion | 2 parts | tetrasodium ethylenediamine tetraacetate | 5 parts | / | / |
| Embodiment 20 Second sublayer | 100 parts | Arylphenyl polyethoxylene ether surfactant | 0.8 parts | Sodium carboxymethyl cellulose | 0.5 parts | Water-borne acrylate emulsion | 5 parts | / | / | Al2O3 | 80 parts |
| Comparative Embodiment 1 | 100 parts | Arylphenyl polyethoxylene ether surfactant | 0.4 parts | Sodium carboxymethyl cellulose | 0.5 parts | Water-borne acrylate emulsion | 2 parts | tetrasodium ethylenediamine tetraacetate | 5 parts | / | / |

TABLE 1-continued

| No. | Deionized water | Dispersant | Amount of dispersant | Thickener | Amount of thickener | Binder | Amount of binder | Complexing agent | Amount of complexing agent | First oxide nanoparticle | Amount of first oxide nanoparticle |
|---|---|---|---|---|---|---|---|---|---|---|---|
| Comparative Embodiment 2 | 100 parts | Arylphenyl polyethoxylene ether surfactant | 0.4 parts | Sodium carboxymethyl cellulose | 0.5 parts | Waterborne acrylate emulsion | 2 parts | tetrasodium ethylenediamine tetraacetate | 5 parts | / | / |

Table 2 shows the structure parameter of the separator in Embodiment 1-Embodiment 21 and Comparative Embodiment 1-Comparative Embodiment 2.

TABLE 2

| | | | | Anode protection layer | | | | |
|---|---|---|---|---|---|---|---|---|
| No. | Number of base film layers | Base film thickness of each layer/μm | Layer structure | Thickness/μm | Weight ratio of complexing agent to first oxide nanoparticle | Thickness ratio of first sublayer to second sublayer | Types of complexing agent | First oxide nanoparticle |
| Embodiment 1 | Bilayer | 7 | Monolayer: comprising complexing agent | 0.5 | / | / | tetrasodium ethylenediamine tetraacetate | / |
| Embodiment 2 | Bilayer | 7 | Monolayer: comprising complexing agent | 0.5 | / | / | Sodium bismetaphosphate | / |
| Embodiment 3 | Bilayer | 7 | Monolayer: comprising complexing agent | 0.5 | / | / | 2-hydroxyiminodiacetic acid | / |
| Embodiment 4 | Bilayer | 7 | Monolayer: comprising complexing agent | 4 | / | / | tetrasodium ethylenediamine tetraacetate | / |
| Embodiment 5 | Bilayer | 7 | Monolayer: comprising complexing agent | 5 | / | / | tetrasodium ethylenediamine tetraacetate | / |
| Embodiment 6 | Bilayer | 7 | Monolayer: comprising complexing agent | 8 | / | / | tetrasodium ethylenediamine tetraacetate | / |
| Embodiment 7 | Bilayer | 7 | Monolayer: comprising complexing agent and first oxide nanoparticle | 1 | 0.06 | / | tetrasodium ethylenediamine tetraacetate | $SiO_2$ |
| Embodiment 8 | Bilayer | 7 | Monolayer: comprising complexing agent and first oxide nanoparticle | 2.5 | 0.06 | / | tetrasodium ethylenediamine tetraacetate | $SiO_2$ |
| Embodiment 9 | Bilayer | 7 | Monolayer: comprising complexing agent and first oxide nanoparticle | 5 | 0.06 | / | tetrasodium ethylenediamine tetraacetate | $SiO_2$ |
| Embodiment 10 | Bilayer | 7 | Monolayer: comprising complexing agent and first oxide nanoparticle | 9 | 0.06 | / | tetrasodium ethylenediamine tetraacetate | $SiO_2$ |
| Embodiment 11 | Bilayer | 7 | Monolayer: comprising complexing agent and first oxide nanoparticle | 11 | 0.06 | / | tetrasodium ethylenediamine tetraacetate | $SiO_2$ |
| Embodiment 12 | Bilayer | 7 | Monolayer: comprising complexing agent and first oxide nanoparticle | 2.5 | 0.07 | / | tetrasodium ethylenediamine tetraacetate | $SiO_2$ |
| Embodiment 13 | Bilayer | 7 | Monolayer: comprising complexing agent and first oxide nanoparticle | 2.5 | 0.08 | / | tetrasodium ethylenediamine tetraacetate | $SiO_2$ |
| Embodiment 14 | Bilayer | 7 | Monolayer: comprising complexing agent and first oxide nanoparticle | 2.5 | 0.13 | / | tetrasodium ethylenediamine tetraacetate | $SiO_2$ |

TABLE 2-continued

| No. | Number of base film layers | Base film thickness of each layer/μm | Layer structure | Anode protection layer Thickness/ μm | Weight ratio of complexing agent to first oxide nanoparticle | Thickness ratio of first sublayer to second sublayer | Types of complexing agent | First oxide nanoparticle |
|---|---|---|---|---|---|---|---|---|
| Embodiment 15 | Bilayer | 7 | Monolayer: comprising complexing agent and first oxide nanoparticle | 9 | 0.06 | / | tetrasodium ethylenediamine tetraacetate | $Al_2O_3$ |
| Embodiment 16 | Bilayer | 7 | Bilayer: first sublayer (complexing agent) + second sublayer (first oxide nanoparticle) | 1 | / | 1:2 | tetrasodium ethylenediamine tetraacetate | $SiO_2$ |
| Embodiment 17 | Bilayer | 7 | Bilayer: first sublayer (complexing agent) + second sublayer (first oxide nanoparticle) | 2.5 | / | 1:2 | tetrasodium ethylenediamine tetraacetate | $SiO_2$ |
| Embodiment 18 | Bilayer | 7 | Bilayer: first sublayer (complexing agent) + second sublayer (first oxide nanoparticle) | 5 | / | 1:2 | tetrasodium ethylenediamine tetraacetate | $SiO_2$ |
| Embodiment 19 | Bilayer | 7 | Bilayer: first sublayer (complexing agent) + second sublayer (first oxide nanoparticle) | 9 | / | 1:2 | tetrasodium ethylenediamine tetraacetate | $SiO_2$ |
| Embodiment 20 | Bilayer | 7 | Bilayer: first sublayer (complexing agent) + second sublayer (first oxide nanoparticle) | 11 | / | 1:2 | tetrasodium ethylenediamine tetraacetate | $SiO_2$ |
| Embodiment 21 | Bilayer | 7 | Bilayer: first sublayer (complexing agent) + second sublayer (first oxide nanoparticle) | 9 | / | 1:2 | tetrasodium ethylenediamine tetraacetate | $Al_2O_3$ |
| Comparative Embodiment 1 | Bilayer | 7 | N.A. | 0 | / | / | tetrasodium ethylenediamine tetraacetate | / |
| Comparative Embodiment 2 | Monolayer | 7 | Monolayer (arranged on a surface of a base film) | 0.5 | / | / | tetrasodium ethylenediamine tetraacetate | / |

In addition, the separator performance of the composite separator obtained in the above Embodiments 1-21 and that of the separator obtained in Comparative Embodiments 1-2 were tested, and the performance of the secondary battery obtained in the above Embodiments 1-21 and Comparative Embodiments 1-2 were also tested. The performance test results are as shown in Table 3 below.

(1) Test of MD Shrinkage and TD Shrinkage of a Separator

The separator of an appropriate length and an appropriate width was made into test samples, which were then placed on a stainless steel plate located in the middle of an air-blast thermostatic drying oven, and heated at a heating temperature of 90° C. for 1 hour. Then, the test samples were taken out, cooled to the test environment temperature, and measured for sizes thereof, to compute the shrinkage of the separator in accordance with the following equation:

$$T=(L_1-L_2)/L\times100\%,$$

In the equation, T is the thermal shrinkage of the separator, %; $L_1$ is the length before heating, mm; and $L_2$ is the length after heating, mm.

The thermal shrinkage measured in the length direction of the test samples of the separator is the TD shrinkage, and the thermal shrinkage measured in the width direction of the test samples of the separator is the MD shrinkage.

(2) Test of Needling Strength of the Separator

An electronic universal testing machine was used. The separator was cut into strips with an art knife, where the width of the striped separator must be greater than 100 mm. A test piece with the width of 100 mm was installed on a sample separator retaining clip ring. Then, the test piece with the width of 100 mm was pricked using a steel needle with a diameter of 1.0 mm and a radius of 0.5 mm at the top of the diameter at a speed of (50±5) mm/min, and a maximum load of the steel needle piercing the test piece was read. 3 or more points were selected from a same test piece for testing, and 5 or more test pieces were selected from a same type of separators for testing. Arithmetic mean of a plurality of pieces of data collected from the test of the same type of separators was taken as the specific strength of the separator.

(3) Cycling Test of a Secondary Battery

First, the secondary battery was charged and discharged once in an environment at room temperature. The secondary battery was first charged at a constant charge current of 0.33 C, and then charged at a constant voltage, until the upper limit voltage was 4.2 V; and then discharged at a constant discharge current of 0.33 C, until the cut-off voltage was 2.8V, where the discharge capacity of the first cycle was recorded. Then, 400 charge-discharge cycles were performed at a temperature of 45° C. at a charge current of 1.0 C/discharge current of 1.0 C in a voltage interval of 2.8-4.2V, the charge-discharge capacity of each cycle was recorded, and a cycling curve was plotted with the number of cycles as the abscissa and with the discharge capacity of each cycle divided by the charge capacity as the ordinate.

(4) Test of Contents of Transition Metals Mn, Co, and Ni in an Anode Electrode Sheet of the Secondary Battery A high-low temperature cycle tester was used for the battery cycle test.

The contents of the transition metal elements Mn, Co, and Ni in the anode electrode sheet of the secondary battery in each Embodiment and each Comparative Embodiment after the same number of charge-discharges were tested using a plasma emission spectrometer.

Table 3 shows the performance test parameters of the separator and the battery in Embodiment 1-Embodiment 21 and Comparative Embodiment 1-Comparative Embodiment 2.

of the separator in Embodiments 1-6 is greatly improved compared with the performance of the separator in Comparative Embodiment 2. The performance improvement of the separator in the Embodiments contributes to preventing a short circuit problem caused by contact between the cathode electrode sheet and the anode electrode sheet due to composite separator deformation during the charge and discharge process, and further improving safety performance and service life of the electrochemical energy storage apparatus in the use process.

As can be seen from comparative analysis of Embodiments 1-6 and Comparative Embodiment 1, the needling strength of the separator in Embodiments 1-6 is better than the needling strength of the separator in Comparative Embodiment 1, showing that the arrangement of the anode protection layer in the bilayer base films contributes to further improving the needling strength of the separator, and further improving application performance of the separator. The separator in Embodiments 1-6 is provided with the anode protection layer to capture a large amount of transition metal ions (transition metals are, for example, Mn, Co, and Ni) dissolved from the cathode electrode sheet, contents of

TABLE 3

| | Separator performance | | | Battery performance Contents of transition metals Mn, Co, and Ni |
|---|---|---|---|---|
| | MD shrinkage/% | TD shrinkage/% | Needling strength/gf | in anode electrode sheet (ppm) |
| Embodiment 1 | 2.54 | 0.60 | 438 | 420 |
| Embodiment 2 | 2.69 | 0.64 | 442 | 807 |
| Embodiment 3 | 2.71 | 0.81 | 444 | 634 |
| Embodiment 4 | 2.45 | 0.52 | 448 | 53 |
| Embodiment 5 | 2.48 | 0.46 | 450 | 42 |
| Embodiment 6 | 2.56 | 0.59 | 450 | 26 |
| Embodiment 7 | 2.41 | 0.49 | 446 | 670 |
| Embodiment 8 | 2.43 | 0.44 | 460 | 265 |
| Embodiment 9 | 2.35 | 0.39 | 479 | 140 |
| Embodiment 10 | 2.17 | 0.30 | 492 | 90 |
| Embodiment 11 | 2.20 | 0.33 | 490 | 80 |
| Embodiment 12 | 2.51 | 0.48 | 450 | 253 |
| Embodiment 13 | 2.56 | 0.51 | 442 | 253 |
| Embodiment 14 | 2.63 | 0.59 | 435 | 253 |
| Embodiment 15 | 2.35 | 0.36 | 479 | 95 |
| Embodiment 16 | 2.41 | 0.49 | 446.01 | 636 |
| Embodiment 17 | 2.40 | 0.41 | 452.77 | 253 |
| Embodiment 18 | 2.31 | 0.33 | 450.69 | 125 |
| Embodiment 19 | 2.27 | 0.30 | 458.99 | 70 |
| Embodiment 20 | 2.21 | 0.36 | 458.98 | 70 |
| Embodiment 21 | 2.25 | 0.37 | 458.29 | 70 |
| Comparative Embodiment 1 | 2.71 | 0.56 | 424 | 1271 |
| Comparative Embodiment 2 | 2.93 | 0.77 | 221 | 420 |

As can be seen from comparative analysis of Embodiments 1-6 and Comparative Embodiment 2, the separator performance of the composite separator provided with bilayer base films (i.e., the first base film and the second base film) and provided with an anode protection layer in the bilayer base films is generally better than that of a general separator provided with a monolayer base film and provided with an anode protection layer on a surface of the monolayer base film. Specifically, the MD shrinkage and the TD shrinkage of the composite separator in Embodiments 1-6 are substantially lower than the MD shrinkage and the TD shrinkage of the separator in Comparative Embodiment 2, and the needling strength of the composite separator in Embodiments 1-6 is higher than the needling strength of the separator in Comparative Embodiment 2. The performance the transition metals detected in the anode electrode sheet in Embodiments 1-6 are lower than contents of the transition metals detected in the anode electrode sheet in Comparative Embodiment 1, and the anode electrode sheet in Embodiments 1-6 is well protected.

The anode protection layer of the composite separator in Embodiments 7-15 is a mixed layer comprising the complexing agent and the first oxide nanoparticle. In Embodiment 7-Embodiment 11, the weight ratio of the complexing agent of the anode protection layer to the first oxide nanoparticle is the same, but the thickness of the anode protection layer is different. As can be seen from Table 3, the anode protection layer is the mixed layer comprising the complexing agent and the first oxide nanoparticle, the thickness of the anode protection layer ranges from 1 µm to 11 µm, and the larger the thickness of the anode protection layer is, the lower the MD shrinkage and the TD shrinkage of the composite separator are, the higher the needling strength is, the better the overall performance of the composite separator is, the lower the contents of the transition metals in Embodiments 7-11 are, and the better the battery performance is. The inventor finds through further researches that when the thickness of the anode protection layer of the composite separator in Embodiment 11 is 11 μm, there is a risk of pore blockage in the base film. Therefore, in some examples, the thickness of the anode protection layer ranges from 2.5 μm to 9 μm.

As can be seen from analysis of Embodiment 8 and Embodiments 12-14, when the thickness of the anode protection layer is constant, increase of the weight ratio of the complexing agent to the first oxide nanoparticle contributes to reducing the contents of the transition metals in the anode electrode sheet, and improving the battery performance.

As can be seen from analysis of Embodiments 16-20 and Comparative Embodiments 1-2, when the anode protection layer comprises the first sublayer with the complexing agent and the second sublayer with the first oxide nanoparticle, and when the thickness ratio of the first sublayer is the same as that of the second sublayer, the larger the overall thickness of the anode protection layer is, the lower the MD shrinkage and the TD shrinkage of the separator are, the higher the needling strength of the separator is, and the better the overall performance of the separator is. With the increase of the overall thickness of the anode protection layer, the contents of the transition metals in the anode electrode sheet of the secondary battery decrease, thereby contributing to optimizing application performance of the secondary battery, and preventing the anode electrode sheet from being affected by deposition of the transition metal ions. The inventor finds through further researches that when the total thickness of the anode protection layer of the composite separator in Embodiment 20 is 11 μm, there is a risk of pore blockage in the base film. Therefore, in some examples, the total thickness of the anode protection layer ranges from 2.5 μm to 9 μm.

As can be seen from analysis of Embodiment 19 and Embodiment 21, the first oxide nanoparticle in the second sublayer may be, e.g., $SiO_2$ nanoparticle and $Al_2O_3$ nanoparticle, both of which can optimize the performance of the composite separator and the application performance of the secondary battery.

Figure 11:
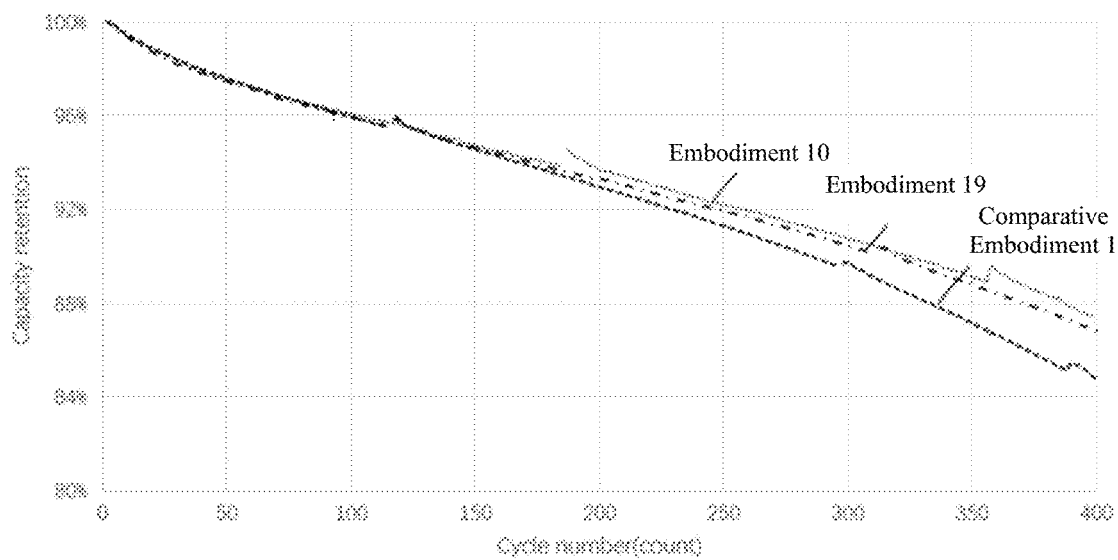
FIG. 11 is a diagram of cycling performance test results of corresponding batteries in Comparative Embodiment 1, Embodiment 10, and Embodiment 19 in the specific Embodiments of the present application.

FIG. 11 is a diagram of cycling performance test results of corresponding batteries in Comparative Embodiment 1, Embodiment 10, and Embodiment 19 in the specific Embodiments of the present application. In FIG. 11, the abscissa is the number of cycles, and the ordinate is the capacity retention rate of the secondary battery. As can be seen from FIG. 11, when the number of cycles is larger, under the same number of cycles, the capacity retention rate of the secondary battery in Comparative Embodiment 1 is lower than the capacity retention rate of the secondary battery provided with the anode protection layer in Embodiment 10 and Embodiment 19, showing that arrangement of the anode protection layer between the first base film and the second base film can improve performance of the battery cell.

To sum up, the performance of the composite separator and the performance of the secondary battery in Embodiment 1 to Embodiment 21 are significantly improved, compared with the performance of the separator and the performance of the secondary battery in Comparative Embodiment 1 and Comparative Embodiment 2. The performance improvement of the composite separator contributes to preventing a short circuit problem caused by contact between the cathode electrode sheet and the anode electrode sheet due to composite separator deformation during the charge and discharge process, and further improving the safety performance and service life of the electrochemical energy storage apparatus in the use process. The arrangement of the anode protection layer in the composite separator protects the anode electrode sheet in the secondary battery, and contributes to optimizing the performance of the battery cell, and improving the battery life.

It should be noted that the present application is not limited to the above embodiments. The above embodiments are merely exemplary, and embodiments having substantially the same technical idea and the same effects within the scope of the technical solutions of the present application are all included in the technical scope of the present application. In addition, without departing from the scope of the subject matter of the present application, various modifications that can be conceived by those skilled in the art are applied to the embodiments, and other modes constructed by combining some of the constituent elements of the embodiments are also included in the scope of the present application.

The invention claimed is:

1. A composite separator, comprising:
   a first base film and a second base film; and
   an anode protection layer located between the first base film and the second base film in a thickness direction of the composite separator, for capturing transition metal ions, wherein
   the anode protection layer comprises a complexing agent and a first oxide nanoparticle, the first oxide nanoparticle being capable of generating lithium oxide and a first elementary substance through a replacement reaction with metal lithium, and
   a weight ratio of the complexing agent to the first oxide nanoparticle is from 0.06 to 0.13.

2. The composite separator according to claim 1, wherein the complexing agent is selected from at least one of a phosphate complexing agent, a hydroxycarboxylate complexing agent, and an aminocarboxylate complexing agent.

3. The composite separator according to claim 1, wherein a thickness value of the anode protection layer ranges from 0.5 μm to 8 μm.

4. The composite separator according to claim 1, wherein the anode protection layer blocks growth of lithium dendrites.

5. The composite separator according to claim 1, wherein the anode protection layer comprises:
   a first sublayer, wherein the complexing agent is distributed in the first sublayer, and the first sublayer captures transition metal ions; and
   a second sublayer stacked with the first sublayer, wherein the first oxide nanoparticle is distributed in the second sublayer.

6. The composite separator according to claim 5, wherein the thickness value of the anode protection layer ranges from 1 μm to 11 μm;
   optionally, a thickness ratio of the first sublayer to the second sublayer is 1:2-4; and
   optionally, a thickness value of the first sublayer ranges from 0.3 μm to 3.5 μm, and a thickness value of the second sublayer ranges from 0.6 μm to 7 μm.

7. The composite separator according to claim 1, wherein the first oxide nanoparticle comprises an oxide nanoparticle of at least one of silicon, zirconium, titanium, cadmium, manganese, iron, cobalt, nickel, aluminum, and copper;

optionally, a particle diameter value of the first oxide nanoparticle ranges from 1 nm to 50 nm.

8. An electrochemical energy storage apparatus, comprising the composite separator of claim 1.

9. An electrochemical energy storage apparatus, comprising:

a cathode electrode sheet;

an anode electrode sheet; and the composite separator of claim 5, wherein the first sublayer is arranged closer to the cathode electrode sheet than the second sublayer.

10. An electrical apparatus, comprising the electrochemical energy storage apparatus according to claim 8.

* * * * *